INVENTORS
ROBERT R. VAN NIMWEGEN
MONTGOMERIE C. STEELE
CURTIS E. BRADLEY

Herschel C. Omohundro
ATTORNEY

United States Patent Office 3,263,907
Patented August 2, 1966

3,263,907
GAS TURBINE
Robert R. Van Nimwegen, Montgomerie C. Steele, and Curtis E. Bradley, all of Phoenix, Ariz., assignors to The Garrett Corporation, Los Angeles, Calif., a corporation of California
Original application Dec. 24, 1962, Ser. No. 246,687. Divided and this application Apr. 28, 1965, Ser. No. 451,586
8 Claims. (Cl. 230—116)

This application is a division of our copending application Serial No. 246,687, filed December 24, 1962, for Gas Turbine.

The invention herein relates generally to engines and more particularly to gas turbine engines in which a rotor assembly revolving at high speed is provided, the assembly requiring precise balancing to reduce or eliminate destructive vibratory impulses.

An object of this invention is to provide novel bearing means for resiliently supporting the rotor assembly of a gas turbine engine so that any minute eccentricity will be compensated for and the tendency to vibrate resulting therefrom will be reduced to a minimum.

Another object of the invention is to provide a novel bearing structure in which an antifriction bearing is resiliently supported by a mounting means of simple construction having a minimum of parts and requiring no attention after once being installed.

Still another object of the invention is to provide a novel bearing construction having means in association with an antifriction bearing to provide a pair of opposed annular channels with spaced end walls, the channels receiving a polygonal resilient element with spaced portions engaging the bottom walls of the channels, the sides of the element engaging and being restricted against axial movement, relative to the rotor supported by the bearing, by the end walls of the channels.

A further object of the invention is to provide the bearing construction mentioned in the preceding paragraph with an octagonal resilient element, the sides of the octagon engaging the bottom wall of the channel in the outer bearing race and the rounded corners of the octagon engaging the bottom wall of the channel in the turbine frame, the edges of the resilient element engaging the channel walls to restrict axial movement of the rotor assembly.

Other objects and advantages of the invention will be made apparent by or specifically set forth in the following description of one form of bearing construction selected for illustration in the accompanying drawings.

Figure 1:
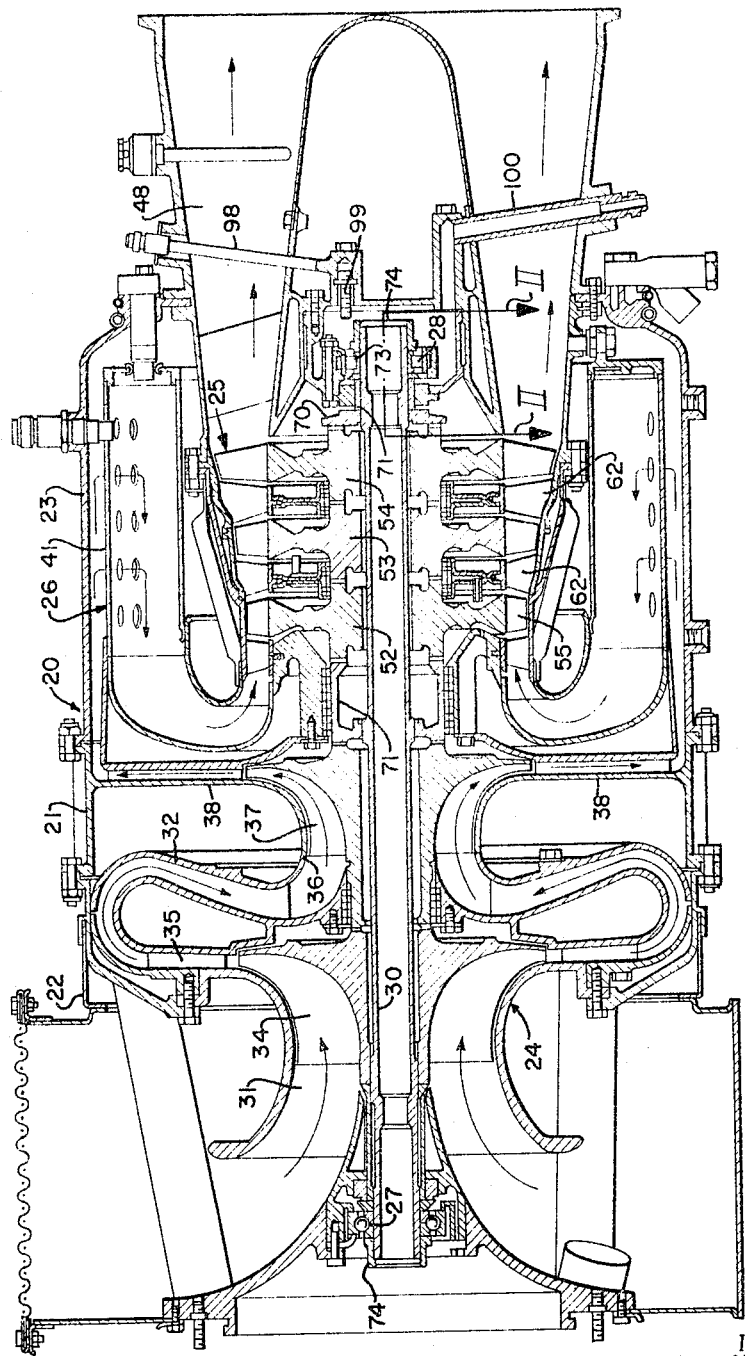
FIG. 1 is an axial sectional view of a gas turbine engine having a rotor assembly mounted in bearings formed in accordance with the present invention.

Referring more particularly to the drawing and especially to FIG. 1, the gas turbine, to which the bearings embodying the invention have been applied, is designated generally by the numeral 20. While the invention herein is directed to the bearing structure for supporting the rotor of the gas turbine engine, the latter will be generally described to facilitate a better understanding of the invention.

The engine 20 is composed of a casing portion and a rotating portion. In the engine illustrated, the casing portion includes a plurality of pieces 21, 22 and 23 assembled to provide a unit which houses the rotating assembly. The latter is also formed of a plurality of pieces to provide a compressor section, designated generally by the numeral 24 and a turbine section generally designated by the numeral 25. The casing pieces 21 and 22 house the compressor section of the rotating assembly and the piece 23 of the casing houses the turbine portion 25 of the rotating assembly.

The parts which form the casing are secured to other parts and together they form a frame for the support of the rotating assembly. This assembly, as above mentioned, includes compressor and turbine sections 24 and 25, respectively. The rotor assembly is mounted in front and rear bearing structures 27 and 28 to which the present invention has been applied. Each of the sections making up the rotating assembly is composed of a plurality of rotor or wheel elements stacked on a tubular shaft 30 and keyed or otherwise coupled together to rotate as a single unit. Spacer rings 70, 71 and 72 and bearing parts 73 are also provided on the shaft, all of these elements being clamped together by nut means 74 threaded onto the ends of the shaft.

First and second stage compressor rotors 34 and 37, respectively, cooperate with inlet 31, crossover 32, and radial diffuser duct 38 elements to deliver compressed air to a combustor 26 disposed in surrounding relationship to the turbine section of the rotor assembly. In the engine illustrated, three wheels 52, 53 and 54 form the turbine section, and nozzle vanes 62, preceding the wheels, direct gases from the combustor against the blades of the wheels to effect rotary movement of the rotor assembly.

Support of the rotor assembly is effected by the bearing structures 27 and 28 forming the subject matter of the present invention. Bearing structure 27 is disposed at the compressor or forward end of the machine. It is substantially the same as bearing 28, which is disposed at the turbine or rear end of the engine, except that the inner race is split or formed of two parts for ease in assembly and it utilizes ball-type antifriction elements rather than cylindrical rollers. It functions also as a thrust bearing to limit axial motion of the rotor assembly.

Figure 2:
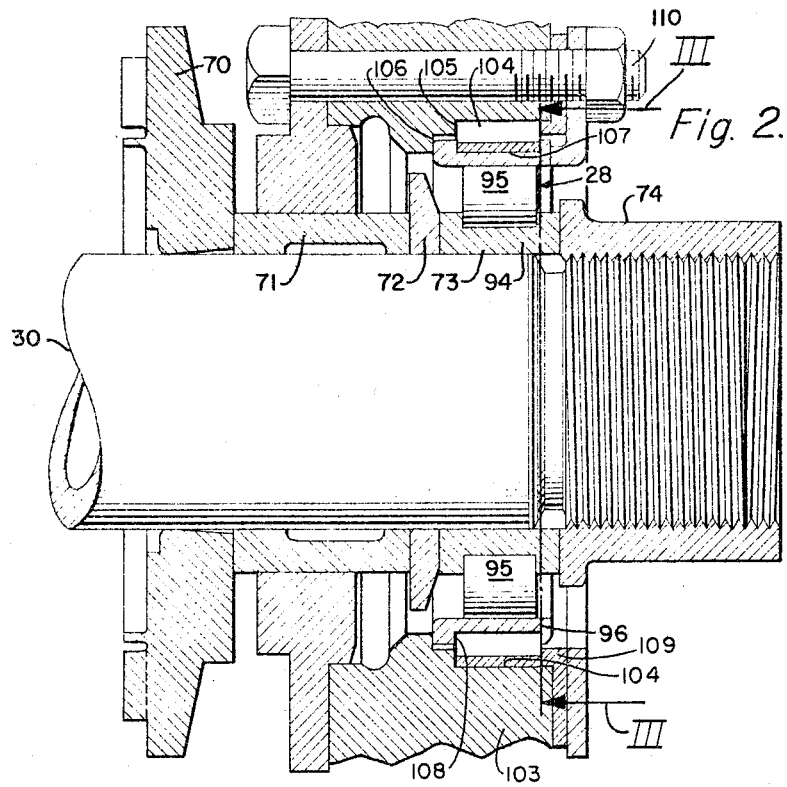
FIG. 2 is a detail axial sectional view taken through one of the bearing structures on the plane indicated by the line II—II of FIG. 1.

As shown more particularly in FIG. 2, a bearing structure formed in accordance with the invention includes an inner race 94, a plurality of antifriction elements (in this instance cylindrical rollers) 95, an outer race 96, and resilient means 97 for supporting the bearing in the machine frame with a predetermined degree of lateral movement or cushion. This bearing is lubricated and cooled by directing oil or other suitable fluid through a tube 98 which extends transversely across the turbine exhaust gas passage 48 and terminates in a nozzle 99 projecting toward the bearing.

The lubricating and cooling fluid is removed through an outlet tube 100 which communicates with the lower end of the chamber in which the bearing is disposed.

Figure 3:
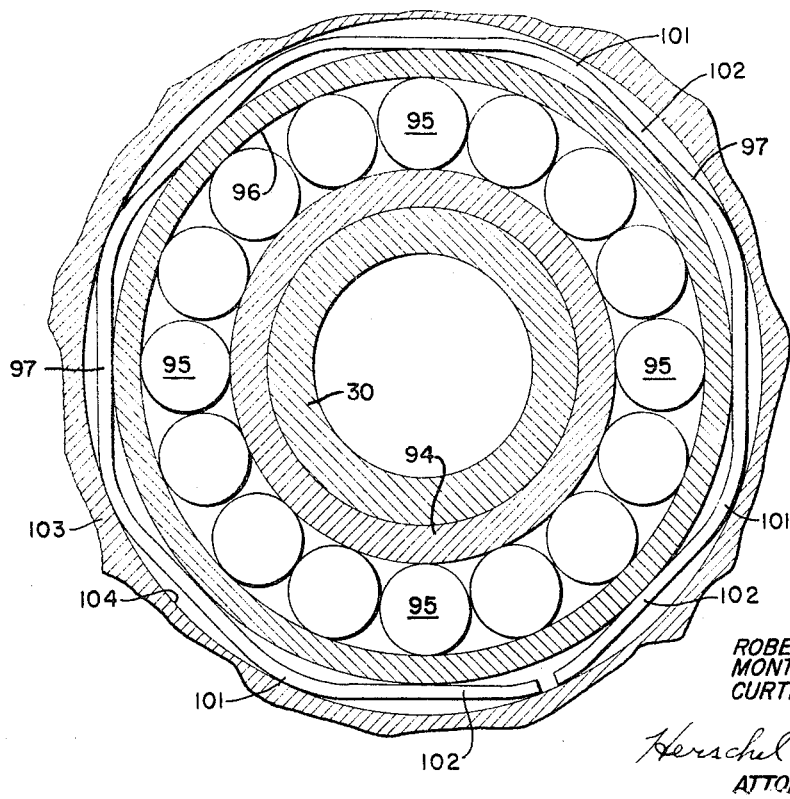
FIG. 3 is a vertical transverse sectional view taken through the bearing structure on the plane indicated by the line III—III of FIG. 2.

As shown in FIGS. 2 and 3, the resilient element 97 is formed of a strip of spring steel or other suitable material bent into a polygonal (an octagon in the form illustrated) shape, which provides a plurality of slightly rounded corners 101 at the ends of straight sides 102. The element 97 is disposed between the outer race 96 and the turbine frame member 103. To receive the element 97 and the bearing 28, the member 103 is counterbored, as at 104, which provides shoulders 105 and 106. The outer race of the bearing is externally grooved or otherwise relieved, as at 107, which also provides a shoulder 108. When the bearing structure is installed, shoulders 105 and 108 are in substantial registration for engagement by one side edge of the element 97. The other side edge of this member is engaged by clamp plates 109 secured to the frame by suitable fastening means 110. It will be observed that the construction provides opposed grooves in the frame and outer bearing race in which the polygonal resilient element is disposed. The side edges of the resilient element engage the registering side walls of the grooves to limit lateral movement of the outer race 96. The side edges of the corner portions of the resilient element engage the sides of the groove provided by the frame and clamp plates while the edges at the intermediate portions of the straight sides of the polygon engage the sides of the groove in the outer race. Lateral force of the outer race is thus transmitted by the element 97 to the shoulder of the groove in the frame.

It will be observed that movement of the rotor assembly in any direction radially from the axis of rotation will be resiliently opposed by the element 97.

While but a single form of the invention has been shown and described in detail, numerous modifications will be obvious to anyone skilled in the art from consideration of this disclosure.

We claim:

1. In a gas turbine engine:
    (a) a casing portion provided with an annular recess having peripheral and end walls;
    (b) a rotating assembly in said casing portion, said rotating assembly having a shaft with compressor rotor and turbine wheel mounted thereon;
    (c) antifriction bearing means disposed in said casing portion to rotatably support said rotating assembly, said bearing means having a race with an annular recess in radial registration with the recess in said casing portion; and
    (d) means resiliently retaining said bearing means in said casing portion for limited lateral movement, said retaining means being formed of strip material bent into a polygon with rounded corner and flat side portions, the corner portions engaging the bottom wall of one recess and the flat side portions engaging the bottom wall of the other recess, the edges of said corner and side portions engaging the end walls of the respective recesses.

2. In a gas turbine engine:
    (a) a casing portion provided with an annular recess having peripheral and end walls;
    (b) a rotating assembly in said casing portion, said rotating assembly having a shaft with compressor rotor and turbine wheel mounted thereon;
    (c) antifriction bearing means disposed in said casing portion to rotatably support said rotating assembly, said bearing means having a race with an annular recess having bottom and end walls, corresponding end walls of said recesses being in radial registration; and
    (d) means resiliently retaining said bearing means in said casing portion for limited lateral movement, said retaining means being formed of a strip of material bent into an octagon with rounded corner and flat side portions, the corner portions engaging the bottom wall of one recess and the flat side portions engaging the bottom wall of the other recess, the edges of the side and corner portions engaging the end walls of the respective recesses to resiliently resist end thrust of said shaft.

3. In a gas turbine engine:
    (a) a casing portion;
    (b) a rotating assembly in said casing portion, said rotating assembly having a shaft with compressor rotor and turbine wheel mounted thereon; and
    (c) bearing means for rotatably mounting said rotating assembly in said casing with a restricted amount of lateral motion, said bearing means having antifriction bearings with inner and outer races separated by rolling elements, said outer race and casing portion being formed with registering shoulder forming grooves, and a resilient supporting and retaining member disposed in said registering grooves with spaced parts engaging said casing portion and outer race, the side edges of the supporting and retaining members engaging the shoulders formed by said grooves to prevent longitudinal displacement of said rotating assembly.

4. Resilient mounting means for a rotary member, comprising:
    (a) support means forming a first annular recess with spaced sides;
    (b) an antifriction bearing means having an outer race element with a second annular recess opposed to said first recess, said second recess having spaced sides substantially registering with the sides of said first recess; and
    (c) a resilient element with alternate angular and substantially straight portions disposed in said recesses, the angular portions of said element engaging the peripheral wall of said first recess and the straight portions engaging the peripheral wall of said second recess, the side edges of said element engaging the sides of said recesses to resist endwise movement of said bearing means.

5. Resilient mounting means for a rotary member, comprising:
    (a) support means forming a first annular recess with spaced sides;
    (b) an antifriction bearing means having an outer race element with a second annular recess opposed to said first recess, said second recess having spaced sides substantially registering with the sides of said first recess; and
    (c) a strip of resilient material shaped to provide alternate curved and substantially straight portions disposed in said recesses, the curved portions engaging the peripheral wall of said first recess and the straight portions engaging the peripheral wall of said second recess, the side edges of said element engaging the sides of said recesses to resist endwise movement of said bearing means.

6. Resilient mounting means for a rotary member, comprising:
    (a) support means forming a first annular recess with spaced sides;
    (b) an antifriction bearing means having an outer race element with a second annular recess opposed to said first recess, said second recess having spaced sides substantially registering with the sides of said first recess; and
    (c) a strip of resilient material shaped into a polygonal form and disposed in said recesses, the corners of said polygonal form engaging the bottom wall of the first recess and side portions engaging the bottom wall of said second recess, the edges of said element engaging the sides of said recesses to confine said bearing against endwise movement relative to said support.

7. Resilient mounting means for a rotary member, comprising:
    (a) support means forming a first annular recess;
    (b) antifriction bearing means having a race element with a second annular recess opposed to said first recess, said recesses having spaced sides; and
    (c) a resilient strip shaped into octagonal form and disposed in said recesses, the corners of said octagon being engaged with the bottom wall of said first recess and the sides of said octagon being engaged with the bottom wall of said second recess, the edges of said strip and the side walls of said recesses being interengaged to limit relative movement of said bearing and support means axially of said rotary member.

8. Resilient mounting means for a rotary member, comprising:
    (a) support means forming a first annular recess;
    (b) antifriction bearing means having a race element with a second annular recess opposed to said first recess, said recesses having spaced sides, the periphery of said race element being spaced from said support means; and (c) a resilient strip shaped into polygonal form and disposed in said recesses, the corners of said polygon being engaged with the bottom wall of said first recess and the sides of said polygon being engaged with the bottom wall of said second recess, said strip resiliently maintaining the periphery of said race element spaced from said support means, the edges of said strip and the side walls of said recesses being interengaged to limit relative movement of said bearing and support means axially of said rotary member.

References Cited by the Examiner

UNITED STATES PATENTS

| | | | |
|---|---|---|---|
| 2,534,142 | 12/1950 | Morton et al. | 308—184 |
| 3,033,622 | 5/1962 | Renner | 308—26 |

FOREIGN PATENTS

| | | |
|---|---|---|
| 575,839 | 4/1924 | France. |

ROBERT M. WALKER, *Primary Examiner.*